April 15, 1958   L. MULLIGAN   2,831,050
CREPE PAPER INSULATION
Filed Dec. 31, 1952
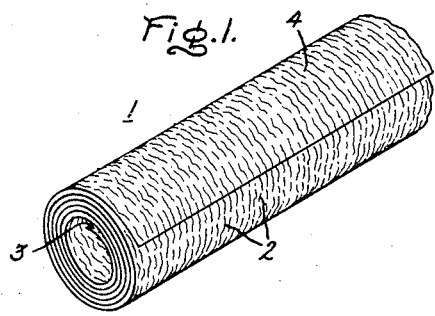
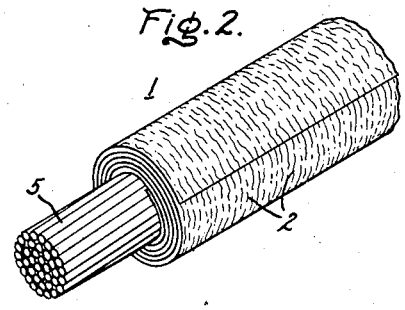
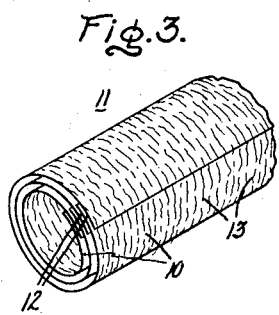
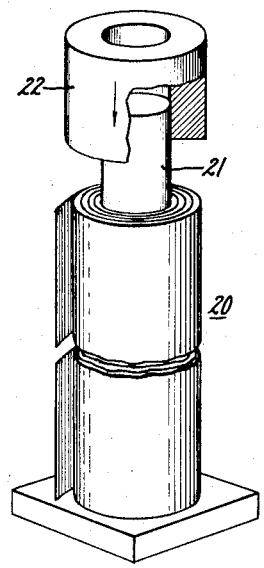
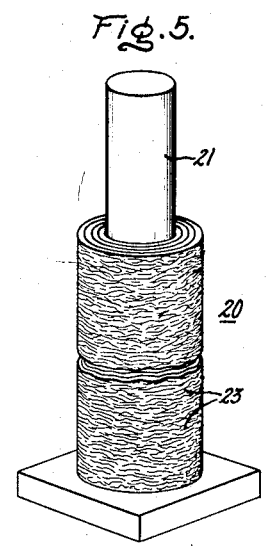
Inventor:
Leo Mulligan,
by Gilbert P. Tarleton
His Attorney.

United States Patent Office 2,831,050
Patented Apr. 15, 1958

2,831,050

CREPE PAPER INSULATION

Leo Mulligan, Dalton, Mass., assignor to General Electric Company, a corporation of New York Application December 31, 1952, Serial No. 329,070

5 Claims. (Cl. 174—122)

This invention relates to insulation for electric cables and, more particularly, to pre-formed crepe paper insulating tubes for such cables.

In certain applications, for example, in the internal connections of an electrical transformer, it is desirable to provide a cable which is capable of being bent into a very small radius without danger of rupturing its insulation. Although crepe paper has been used in the past to provide a flexible insulation, this insulation has been wound or otherwise formed directly on the conductor, as is disclosed in U. S. Patents 2,607,823 and 2,607,824, both of which issued jointly to Guglielmo Camilli and Leo Mulligan and are assigned to the same assignee as the present invention. When such insulation is wound over long lengths of conductors in the form of narrow crepe paper tape, unless special precautions are taken, the tape often stretches and becomes distorted during the winding process, thereby preventing the tape from being precisely positioned on the conductor, thus destroying the uniformity of the insulation. An additional disadvantage of this wound tape type of crepe paper insulation becomes apparent when the insulation thickness is small. For example, a cable employing only a few layers of this wound tape type of insulation cannot be bent into a small radius without causing a high percentage of the total insulation to become ineffective because of the opening of the seams within the insulation and the general distortion of the crepe paper. These defects are especially apparent in thin-walled insulation since no outer layers are present to provide the support necessary to resist these undesirable characteristics.

Still further, where short lengths of cable having exposed conductor ends are needed, these can be produced at a substantial saving in manufacturing costs by applying a pre-formed insulating tube of proper length to the conductor. The use of such a tube avoids the expenses incident to the usual operation of removing insulation from the ends of the conductor.

It is an object of my invention to provide a new and improved insulation for electric cables which will permit such cables to be bent into curvatures of very small radius without impairing the insulation.

It is a further object of my invention to provide a highly flexible insulating tube which is easily formed and applied to an electrical conductor.

In accomplishment of these objectives this invention provides a crepe paper insulation for an electric conductor in which said insulation is in the form of a highly flexible, permanent pre-formed insulating tube which, after formation, is fitted about said conductor. The invention will be better understood by considering the following description taken in connection with the accompanying drawing and its scope will be pointed out in the appended claims.

In the drawing, Fig. 1 represents an insulating tube constructed in accordance with my invention, Fig. 2 shows the tube of Fig. 1 applied to a conductor, Fig. 3 is a modified form of an insulating tube constructed in accordance with my invention, Fig. 4 illustrates an intermediate step in the formation of still another modified form of my invention and Fig. 5 is a perspective view of the finished form of the tube shown in Fig. 4.

Referring now to the drawing, there is shown in Fig. 1 a highly-flexible insulating tube 1 formed of a sheet of crepe paper having crepe lines 2 extending in planes generally perpendicular to the axis of the tube. The tube comprises a plurality of layers, the inner layer 3 of which is bonded to its adjacent layer by a suitable adhesive applied to the outer surface of said inner layer. Similarly, the outer layer 4 of the tube is adhesively bonded to its adjacent layer.

This tube 1 is formed by winding about an elongated cylindrical mandrel (not shown) a sheet of crepe paper having its crepe lines perpendicular to the axis of the mandrel. However, before the winding operation, the crepe paper is calendered so as to provide a surface more suitable for bonding by the adhesive to be used thereon. The calendering also increases the density of the crepe paper thereby improving both its dielectric properties and its space factor. The improved space factor permits a greater number of insulating layers for a given cable diameter. This calendering operation may be accomplished by passing the crepe paper between two metal rolls which are maintained closer together than the thickness of the crepe paper. After the calendering, a thin coating of adhesive is applied to portions of the calendered surface so that when the paper is then wound about a suitable mandrel, the inner and outer layers of the finished tube will be bonded to their respective adjacent layers by this adhesive. After the adhesive sets, the tube becomes a unitary assembly which may then be removed from the mandrel for subsequent use as a flexible insulating tube. The adhesive prevents the tube from becoming unwound either before or during its use as an insulator. The tube may then be applied to a conductor of suitable size, such as shown at 5 in Fig. 2. Substantial savings in manufacturing costs can be obtained by using my pre-formed insulating tubes instead of the conventional cable having insulating material formed on the conductor throughout its length. By using pre-formed tubes of the proper length, among the expenses which are eliminated are those which are usually encountered in cutting away the cable insulation to provide exposed conductor ends.

It should be noted that it is especially advantageous to dispose the crepe lines in the specific direction shown. Since the crepe paper has its maximum yieldability in a direction perpendicular to its crepe lines, the maximum yieldability of the paper is available along the axis of the tube. This results in maximum flexibility of the finished cable and permits it to be bent to an extremely small radius without rupturing the insulation. An additional feature of disposing the crepe lines in the specific direction shown is that the maximum resistance to distortion during the winding process is available. This is so because the winding stresses would be applied in the same direction as the crepe lines 2 extend. In this direction the crepe paper is substantially non-yielding and, therefore, offers a maximum resistance to distortion during winding.

In Fig. 3 there is shown a modified form of the invention. The layers 10 of the tube 11 are shown partially disassembled to illustrate the construction of the tube. The insulating tube 11 is formed of a plurality of concentric layers of crepe paper, each layer comprising an individual strip of calendered crepe paper rolled into a cylinder having overlapping ends 12. These ends are bonded by an adhesive, thereby forming an overlapping seam running the length of the tube. Additionally, all of the individual layers are bonded together by adhesive interposed between adjacent layers. The resulting tube may then be applied to a conductor in the same manner as the tube of Fig. 1. The crepe lines 13 of tube 11 are disposed in planes substantially perpendicular to the tube axis so as to provide maximum tube flexibility, as described with respect to Fig. 1.

Still another embodiment of the invention is shown in Figs. 4 and 5. The tube 20 of this embodiment is formed by first applying a thin adhesive coating to a length of regular flat insulating paper. The paper is then wound about a mandrel 21. After the adhesive dries and the tube is still on the mandrel, it is axially compressed by suitable means such as shown at 22 to approximately 75 percent of its original length. This axial compression provides each layer of paper with corrugations or crepe lines 23 extending in planes generally perpendicular to the axis of the tube. After the tube is removed from the mandrel, it is then available for use as a flexible insulating tube, as is described with respect to the other embodiments.

While there have been shown and described particular embodiments of the invention, it will be obvious to those skilled in the art that changes and modifications may be made without departing from the invention, and that it is intended by the appended claims to cover all such changes and modifications as fall within the true spirit and scope of the invention.

What I claim as new and desire to secure by Letters Patent of the United States is:

1. An insulating article of manufacture for a flexible electric cable construction comprising a permanent pre-formed insulating tube for closely surrounding a flexible electric conductor, said tube comprising a plurality of axially continuous layers of crepe paper having crepe lines encircling said tube in planes which are substantially perpendicular to the axis of the tube, the innermost layer of said crepe paper being bonded to its adjacent layer by an adhesive, and the outermost layer of said crepe paper being bonded to its adjacent layer by an adhesive.

2. An insulating article of manufacture for a flexible electric cable construction comprising a permanent pre-formed insulating tube for closely surrounding a flexible electric conductor, said tube comprising a plurality of axially continuous layers of crepe paper having crepe lines encircling said tube in planes which are substantially perpendicular to the axis of the tube, each of said layers comprising an integral sheet of crepe paper having a width in the direction of the tube axis equal to the length of said tube, the innermost layer of said crepe paper being bonded to its adjacent layer by an adhesive, and the outermost layer of said crepe paper being bonded to its adjacent layer by an adhesive.

3. An insulating article of manufacture for a flexible electric cable construction comprising a permanent pre-formed insulating tube for closely surrounding a flexible electric conductor, said tube being formed of a single sheet of crepe paper wound into a plurality of substantially concentric axially continuous layers having crepe lines which encircle said tube in planes which are substantially perpendicular to the axis of the tube, the innermost layer of said crepe paper being bonded to its adjacent layer by an adhesive, and the outermost layer of said crepe paper being bonded to its adjacent layer by an adhesive.

4. An insulated conductor arrangement consisting of an elongated flexible electrical conductor, and an integral permanent pre-formed insulating tube having an inner diameter slightly greater than the diameter of said electrical conductor slidably arranged on and closely surrounding said conductor, said insulating tube comprising a plurality of axially continuous layers of crepe paper having crepe lines encircling said tube in planes which are substantially perpendicular to the axis of the tube, the innermost layer of said crepe paper being bonded to its adjacent layer by an adhesive, and the outermost layer of said crepe paper being bonded to its adjacent layer by an adhesive.

5. The arrangement as defined in claim 4 wherein said insulating tube is shorter than said electrical conductor and is arranged thereon with opposite ends of the conductor exposed, whereby connection can be made to the ends of the conductor without removing the end portions of its insulating covering.

References Cited in the file of this patent

UNITED STATES PATENTS

| | | |
|---|---|---|
| 1,284,295 | Frederick | Nov. 12, 1918 |
| 1,905,789 | Benner | Apr. 25, 1933 |
| 1,979,444 | Boyle | Nov. 6, 1934 |
| 1,986,181 | Boyle | Jan. 1, 1935 |
| 2,097,501 | Reichelt | Nov. 2, 1937 |
| 2,359,544 | Camilli | Oct. 3, 1944 |
| 2,434,793 | Feaster | Jan. 20, 1948 |
| 2,607,823 | Camilli et al. | Aug. 19, 1952 |